Sept. 28, 1965  W. E. N. DOTY  3,209,322

METHOD OF SEISMIC PROSPECTING

Original Filed Jan. 29, 1959

INVENTOR.
WILLIAM E. N. DOTY
BY Floyd Trimble
ATTORNEY

United States Patent Office 3,209,322
Patented Sept. 28, 1965

3,209,322
METHOD OF SEISMIC PROSPECTING
William E. N. Doty, Ponca City, Okla., assignor to Continental Oil Company, Ponca City, Okla., a corporation of Delaware
Continuation of application Ser. No. 789,975, Jan. 29, 1959. This application Nov. 22, 1963, Ser. No. 326,328
9 Claims. (Cl. 340—15.5)

This is a continuation of applicant's copending application Serial No. 789,975, filed January 29, 1959, and entitled, "Compositing Sequentially Produced Signals," now abandoned.

This invention relates generally to improvements in the art of seismic prospecting, and is an improvement over the method of determining the travel time of a signal disclosed and claimed in U.S. Patent 2,688,124 and the copending application of the present inventor and John M. Crawford, Serial No. 426,182 filed April 28, 1954, now Patent No. 2,989,726, issued June 20, 1961.

The above-mentioned patent and application are concerned with the process of determining the travel time of a signal between spaced points wherein there is transmitted from a local area a vibratory signal made up of a succession of energy pulses which, after propagation over a plurality of paths, is then received in a remote local area, which transmitted signal is nonrepetitive during a time interval which is substantially longer than the travel time of such signal along any of said paths by which it reaches the detection area at usable energy levels and in which, for a predetermined period which is at least as long as said travel time plus the uninterrupted duration of said transmitted signal or two times the travel time whichever is the shorter, there are simultaneously and individually recorded time series respectively representative of said transmitted signal and said received signal and such time series are then correlated while shifting the time-phase relation thereof with respect to their time-phase relation as originally recorded and in which the amount of said time-phase shift which yields the greatest magnitude of the correlation value is a parameter of said travel time.

As it is well known in the art of reflection type seismic prospecting, a seismic disturbance created at or near the surface of the earth generates various types of seismic waves, i.e., various components of the initial seismic wave, which follow different paths before reaching spaced detecting stations. Since the purpose of the reflection method is to determine the depth of geological reflectors and discover their structural features, only reflection paths are of interest and convey the desired information. The other paths create a perturbing effect which is commonly designated interference or noise. Examples of the undesired paths are surface, refraction, diffraction and scatter. However, the vertical or substantially vertical reflections reach spaced detectors substantially simultaneously; whereas, the interference or noise reaches the detectors at varying times. In other words, while the interferences and noises have substantial or random phase differences between spaced detector locations, the reflected waves are substantially in phase at all the receiving points.

One of the most popular procedures for minimizing the effect of interferences and noise is by what is commonly known in the art as a compositing procedure. Several different seismic disturbances are sequentially created at spaced transmitting stations and the resulting seismic waves are detected by a plurality of detectors, with the detectors being located in the same positions during the creation of each seismic disturbance of the series. The seismic energy received at each detector location is usually recorded on a magnetic recording medium, such that a recorded trace or track is provided for each detector location corresponding to each seismic disturbance of the series. The tracks corresponding to each detector location are then simultaneously, but individually, reproduced to provide a plurality of individual electrical signals corresponding to the individual seismic signals received at the respective location. These individual electrical signals are then combined in a relatively complicated mixing circuit to provide a composite signal for each detector location. It will be apparent to those skilled in the art that when a set of the individual signals are composited in a mixing circuit, the random interference and noise will be minimized to provide a resulting signal from which reflections may be located.

The present invention contemplates a method of seismic prospecting wherein a series of seismic disturbances are sequentially produced at different locations by use of a mechanical type vibrator or the like to generate a series of time-spaced seismic signals in the earth. The seismic signals are received at a plurality of receiving stations and are fed to a novel recording and reproducing apparatus. The signals received at each receiving station are recorded on a magnetic recording medium as a set of tracks arranged in parallel and side-by-side relationship. All of the tracks in each set corresponding to each detector location are then scanned simultaneously by a single reproducing means to composite the individual signals represented by the tracks during reproduction. The resulting composite signal is then correlated with a replica of one of the transmitted signals to provide a correlation curve from which the travel time of the signal to a geological reflector may be determined. This invention also contemplates the use of a synchronizing signal recorded on the recording medium for operating the vibrator identically at each transmitting station to further enhance the accuracy of the travel time determination.

An important object of this invention is to provide an efficient method of reflection type seismic prospecting which requires a minimum of time to perform.

Another object of this invention is to minimize the damage in seismic prospecting and yet provide resulting records which may be easily interpreted.

A further object of this invention is to minimize the complexity and cost of the equipment required to composite a series of sequentially produced signals in a method of seismic prospecting.

Another object of this invention is to provide the maximum utilization of the data storage capacity of a recording medium being used in a method of seismic prospecting.

Other objects and advantages of the invention will be evident from the following detailed description, when read in conjunction with the accompanying drawings which illustrate my invention.

Figure 1:
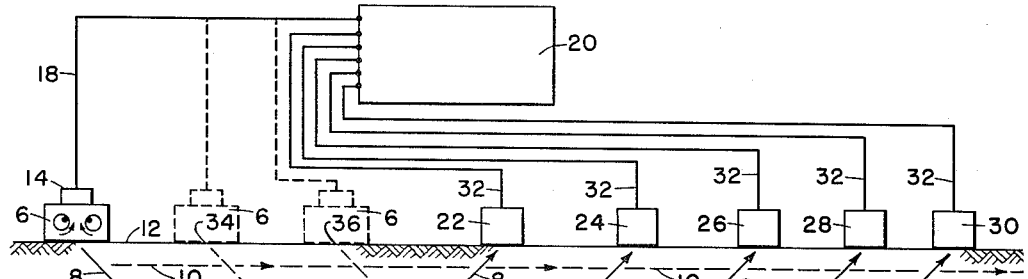
FIGURE 1 is a diagrammatic illustration of a field procedure embodying the present invention.

Referring to the drawings in detail, and particularly FIG. 1, reference character 6 designates a source of any suitable type capable of generating a long duration, continuous type of variable frequency seismic signal in the earth. As previously indicated, various components of the seismic waves generated by the vibrator 6 will follow various paths through the earth, and, for purposes of illustration, I have shown only two paths 8 and 10, with the path 8 indicating a reflection type of wave and the path 10 indicating a surface wave which travels along the surface 12 of the earth. A controller 14 is mounted on the vibrator 6 for controlling the frequency of operation of the vibrator 6 and hence controlling the frequency of the seismic waves 8 and 10. The controller 14 may be of any suitable type, such as the controller disclosed in U.S. Patent No. 2,844,777, and is energized by signals fed thereto through a conductor 18 from a novel recording mechanism 20, as will be more fully hereinafter set forth.

A plurality of detectors 22, 24, 26, 28 and 30 are positioned on the surface 12 of the earth in spaced relation with respect to one another and in spaced relation with respect to the vibrator 6. As indicated by the arrows or paths 8 and 10, each of the detectors 22 through 30 will receive seismic waves which have followed various paths from the vibrator 6. The detectors 22 through 30 operate in the usual fashion to convert seismic signals to electrical signals. The respective electrical signals provided by each detector are fed through its respective conductor 32 to the novel recording apparatus 20. It may also be noted that each of the detectors 22 through 30 may actually be a single detector at each of the receiving locations or stations noted on the drawing, or a nest of detectors at each of such locations. In the event several nests of detectors are used, all of the signals provided by the detectors of each nest are normally combined in a common conductor 32 and fed to the recorder 20.

In operation of a system of the type illustrated in FIG. 1, the vibrator 6 is first operated through a predetermined frequency range and for a predetermined length of time in response to a signal fed from the recorder 20 through the conductor 18, with the vibrator 6 being positioned as illustrated in full lines in FIG. 1. The resulting seismic waves generated in the earth are received at all of the detectors 22 through 30 and each of the detectors feeds an electrical signal to the recorder 20 corresponding to the seismic energy received.

The vibrator 6 is then moved to a location designated by reference character 34 and is again operated by a signal being fed through the conductor 18. As will be more fully hereinafter set forth, the vibrator 6 is operated in the same manner at each transmitting station to generate identical seismic waves in the earth at each station. The resulting seismic waves are received by the detectors 22 through 30; converted to electrical signals, and then fed through the conductors 32 to the recorder 20. The vibrator 6 is then again moved to another transmitting station 36 and the procedure is repeated. Any desired number of transmissions may be used, depending upon the difficulties encountered in a specific geographical area. Also any desired number of detectors or detector nests may be used to obtain the desired records.

Figure 2:
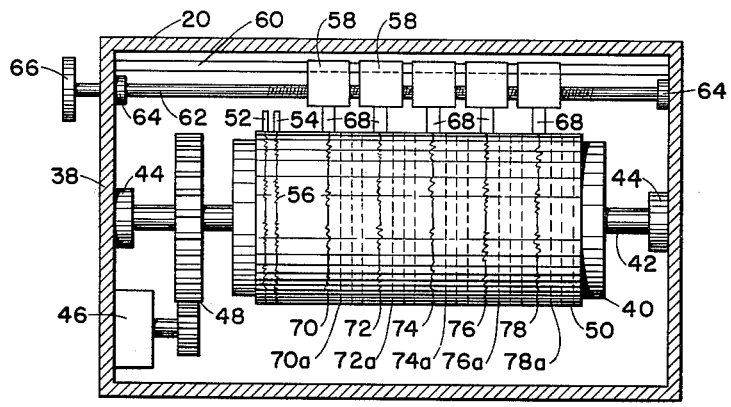
FIGURE 2 is a schematic plan view of a compositing recorder used in practicing the present invention.

The recorder 20 is illustrated in detail in FIG. 2 and comprises a suitable frame 38 having a cylindrical drum 40 rotatably supported therein by means of a shaft 42 extending lengthwise through the center of the drum and mounted in bearings 44 in the opposite ends of the frame 38. A suitable motor 46 is also supported in the frame 38 and drives the drum 40 through a gear system 48 to provide rotation of the drum 40 around its longitudinal axis at the desired speed. The drum 40 may be formed out of a material which functions as a magnetic recording medium, but it is preferred that a sheet 50 of a magnetic recording medium be secured around the periphery of the drum. The recording medium 50 may be secured on the drum 40 in any suitable manner, such as illustrated in U.S. Patent No. 2,806,757.

A pair of magnetic recording heads 52 and 54 are mounted in the frame 38 in stationary positions adjacent the periphery of the drum 40, preferably at one end of the drum. The head 52 is utilized to record a timing track on the recording medium 50 and the head 54 is utilized to record what will be hereinafter referred as as a synchronizing track on the recording medium 50. The head 54 is also used to reproduce the synchronizing track 56 at each rotation of the drum 40, and is connected to the vibrator 6 by the conductor 18 illustrated in FIG. 1. Thus, the same signal represented by the synchronizing track 56 is used to control each operation of the vibrator 6 and provide identical transmissions by the vibrator 6 at the various transmitting stations. The timing track provided by the head 52 is used to interpret the time relation of the other tracks recorded on the recording medium 50.

A plurality of holders 58 are slidingly secured on one side of the frame 38 on a slide bar 60 for movement parallel with the longitudinal axis of the drum 40. This longitudinal movement of the heads 58 is controlled by a shaft 62 supported by bearings 64 at the opposite ends of the frame and threaded through each of the holders 58. A suitable dial and hand wheel 66 is secured on one end of the shaft 62 to provide precise manual control of the movement of the holders 58. It will also be noted that the holders 58 may be easily threaded onto the shaft 62 in such a manner that the holders 58 will be moved equal distances upon turning of the shaft 62. A magnetic recording head 68 is carried by each of the holders 58 adjacent the outer periphery of the drum 40 to record tracks 70, 72, 74, 76 and 78 on the recording medium 50. Any desired number of holders 58 and recording heads 68 may be used, depending upon the size of the recording medium 50, and each of the recording heads 68 is connected to one of the detectors or nests of detectors 22 through 30 illustrated in FIG. 1 by the respective conductor 32.

In operation of the recorder 20, the holders 58 are moved to one extremity of the recording medium 50 as illustrated in full lines in FIG. 2. The drum 40 is then turned to feed the synchronizing signal reproduced by the head 54 through the conductor 18 to control the frequency of operation of the vibrator 6. It is preferred that the synchronizing signal be a long duration signal and have a constantly varying frequency, for the most efficient correlation of the transmitted signal, as noted in U.S. Patent No. 2,688,124. The resulting seismic waves received by the various detectors 22 through 30 are recorded by the heads 68 as the tracks 70 through 78.

At the completion of one rotation of the drum 40, the drum is stopped and the recording heads 68 are indexed to the right (when viewed as in FIG. 2) by turning the shaft 62. As the recording heads 68 are being indexed, the vibrator 6 is moved to a new transmitting location. The drum 40 is then again turned to operate the vibrator 6 in accordance with the signal reproduced from the synchronizing track 56 and the new seismic waves received at the detectors 22 through 30 are recorded by the heads 68 on the recording medium 50 as indicated by the dashed lines 70a, 72a . . . 78A. This operation is repeated at each of the transmitting stations of the vibrator 6 to provide a set of parallel tracks on the recording medium 50 corresponding to the series of seismic signals received at each of the detector locations, with each track corresponding to one received signal of the series. It will also be noted that when the drum 40 is turned at a uniform speed, the relative circumferential positions of the tracks 70, 70A, 72, 72a . . . 78a with respect to the synchronizing track 56 represent the difference in times between transmission and reception of the seismic signals.

Figure 3:
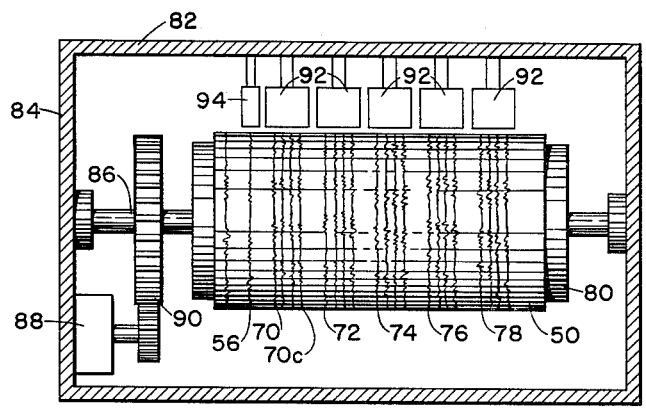
FIGURE 3 is a schematic plan view of a compositing reproducer used in practicing this invention.

When the desired number of transmissions have been made, the recording medium 50 is transferred from the drum 40 of the recorder 20 to the drum 80 of a reproducer generally designated by reference character 82 and illustrated in FIG. 3. Reproducer 82 comprises a suitable frame 84 having a shaft 86 journaled in the opposite ends thereof to rotatably support the drum 80 in the frame. The drum 80 is turned by a suitable motor 88 through a suitable gear system 90 in the usual fashion. A magnetic reproducing head 92 is supported in a fixed position in the frame 84 opposite each set of parallel tracks recorded on the medium 50 by the recording heads 68 of the recorder 20, and each reproducing head is of a size to scan all of the tracks in the respective set. In other words, one of the reproducing heads 92 is positioned opposite the tracks 70 through 70c recorded on the medium 50 by the recording head 68 located closest to the stationary head 54 in the recorder 20, and the remaining reproducing heads 92 are similarly located with respect to the tracks recorded by the remaining heads 68. In this connection it will be noted that the reproducing heads 92 must be substantially wider than the recording heads 68, or at least substantially wider than the individual tracks. In a preferred embodiment, the reproducing heads 92 are of standard size and the recording heads 68 are substantially smaller to provide tracks on the recording medium 50 of a width of about 0.012" and the heads 68 are indexed each time a distance sufficient to provide a spacing between adjacent tracks of each set of about 0.002".

In operation of the reproducer 82, the drum 80 is turned by the motor 88 and gear system 90 to provide a simultaneous scanning of all of the tracks in each set of tracks opposite each reproducing head 92. As a result, each reproducing head 92 provides a compositing of all of the signals represented by the tracks scanned by the respective head and provides a composite signal having an instantaneous amplitude equal to the algebraic addition of the instantaneous amplitudes of all of the signals of each series of signals received by one of the detectors. And, since all of the received signals of a series are synchronized with respect to the respective transmissions upon being recorded on the medium 50, the compositing of all signals represented by each set of tracks will be equivalent to the simultaneous transmission of the signals through the earth, in that the random variations in the signals will be minimized and the synchronized variations resulting from reflected waves will be intensified in the composite signal. In addition, another reproducing head 94 is supported in a fixed position in the frame 84 of the reproducer 82 adjacent the track 56 to reproduce the synchronizing signal simultaneously with the compositing provided by the heads 92, and the time relations between the transmitted and received signals will be preserved, as previously indicated. The synchronizing signal and the composite signals are then fed to a suitable multiplying and integrating circuit as described in U.S. Patent No. 2,688,124 to correlate the synchronizing signal with the composite signals and provide the necessary correlation curves. These correlation curves are then interpreted in the manner described in the above-mentioned patent to provide the travel times of the reflection waves.

In the construction and operation of the recorder 20 and reproducer 82, it is desirable that the magnetic tracks representing the received signals and made by each recording head be placed as close together as possible to minimize the required data storage area and to minimize the required size of the reproducing heads. The width of each track is limited only by the required signal-to-noise ratio required in the specific area being investigated. As it is well known in the art, the wider the magnetic track, the greater the signal-to-noise ratio. As previously indicated, a track width of 0.012" has been used in a commercial embodiment of the present invention with acceptable results. The minimum spacing between adjacent tracks made by each recording head is limited only by the erasing effect. Each recording head is provided with a biasing current during the recording operation and this biasing current tends to erase all information of the recording medium adjacent the track being recorded. It may be noted, however, that the merging of two adjacent tracks of any particular set of tracks, that is, cross-talk, is no problem in the present invention since the reproduction of a complete set of the tracks by a single reproducing means provides one hundred percent cross-talk. In a commercial system embodying this invention, and as previously indicated, a spacing of 0.002" between the adjacent tracks of each set of tracks has been found practical.

In a commercial seismic operation using the correlation technique, it is usually desirable to perform the correlation operation at a laboratory or the like which is normally located remote from an area being investigated. The present method is particularly adapted to such an operating scheme. The recorder 20 may be used in the field operation and it is only necessary to transport the recording medium 50 (with the tracks 56, 70 etc. thereon) to the laboratory. The reproducer 82 is then used in the laboratory to reproduce a replica of the transmitted signal from the track 56 and reproduce the composite signals from the various tracks 70 etc. as previously described for use in a multiplier and integrator which are also located in the laboratory.

From the foregoing it will be apparent that the present invention provides a novel method of seismic prospecting wherein the seismic energy transmitted over unwanted paths will be effectively minimized and the resulting records more easily interpreted. A large number of sequential transmissions may be used for an effective compositing operation, without damage to the surface of the earth being prospected. Also, the transmission of identical signals at the various transmitting stations greatly increases the precision obtained when a replica of one of the transmitted signals is correlated with the composite signals. The prospecting method provided by this invention may be practiced in a minimum of time, with a minimum of equipment, and more economically than conventional prospecting methods using explosives for generating the seismic signals.

Changes may be made in the combination and arrangement of steps and procedures, as well as parts or elements, as heretofore set forth in the specification and shown in the drawings without departing from the spirit and scope of the invention as defined in the following claims.

I claim:
1. In a method of seismic prospecting using a vibrator as the seismic wave source, the improvement comprising:
   recording a replica, as to frequency content and time duration, of the seismic signal desired to be transmitted into the ground;
   reproducing said replica as an electrical signal; and
   controlling the frequency of operation and time duration of operation of the vibrator with said electrical signal.

2. In a method of seismic prospecting using a vibrator as the seismic wave source, the improvement comprising:
   recording a replica, as to frequency content and time duration, of a seismic signal desired to be transmitted into the ground;
   sequentially reproducing said replica as an electrical signal a plurality of times to provide a plurality of sequential, identical electrical signals; and
   controlling the frequency of operation and time duration of operation of the vibrator with said electrical signals to transmit a plurality of sequential, identical seismic waves into the ground.

3. The method defined in claim 2 wherein said sequential, seismic waves are transmitted into the ground at different locations, and characterized further to include:
   receiving the successively reflected seismic waves at a location remote from the transmitting locations;
   converting said received, reflected seismic waves into electrical signals; and
   compositing said last-mentioned electrical signals.

4. The method defined in claim 3 characterized further to include:
   recording said electrical signals representing said successive, received seismic waves as parallel tracks in side-by-side relation; and wherein said compositing is performed by
   simultaneously reproducing said tracks as a single, composite signal having an instantaneous amplitude equal to the algebraic addition of the instantaneous amplitudes of all the received seismic waves.

5. A method of seismic prospecting in the earth comprising:

recording a replica, as to frequency content and time duration, of the seismic signal desired to be transmitted into the earth;

sequentially reproducing said recorded signal as an electrical signal; each individual electrical signal corresponding in frequency content and time duration to said replica;

converting each of said electrical signals to an acoustic signal and applying each of said acoustic signals to the earth to form a series of sequentially transmitted seismic signals;

receiving said sequentially transmitted seismic signals after they have traversed a portion of the earth; and individually recording each of said sequentially received seismic signals on the same recording medium as the recording of said replica and in relative time synchronism with the record of said replica.

6. The method defined in claim 5 wherein said sequentially received seismic signals are recorded on the recording medium as parallel tracks arranged in side-by-side relation, and characterized further to include the step of:

simultaneously reproducing and adding the signals represented by said parallel tracks to produce a single, composite signal having an instantaneous amplitude equal to the algebraic addition of the instantaneous amplitudes of all the received seismic signals.

7. In a method of seismic prospecting, the steps of:

sequentially transmitting a series of seismic signals into the earth at a plurality of transmitting stations to provide a series of time spaced seismic signals;

receiving the various components of each transmitted signal of the series at a detecting station located remote from the transmitting stations;

recording the series of signals received at the receiving station as a set of parallel tracks on a recording medium arranged in side-by-side relation, with each track corresponding to one received signal of the series;

simultaneously reproducing and adding the signals represented by said set of tracks to produce a composite signal having an instantaneous amplitude equal to the algebraic addition of the instantaneous amplitudes of all the received signals, then correlating the composite signal with one of the transmitted signals.

8. A method as defined in claim 7 wherein each seismic signal is a vibratory signal having a constantly varying frequency.

9. A method as defined in claim 7 wherein all of the transmitted seismic signals are identical with respect to frequency content and time duration.

References Cited by the Examiner

UNITED STATES PATENTS

| | | | |
|---|---|---|---|
| 2,235,089 | 3/41 | Sparks | 340—15.5 |
| 2,521,130 | 9/50 | Scherbatskoy | 181—.5 |
| 2,728,405 | 12/55 | Brant | 181—.5 |
| 2,754,492 | 7/56 | Parker | 340—15.5 |
| 2,767,389 | 10/56 | McCollum | 181—.5 |
| 2,874,795 | 2/59 | Doty et al. | 181—.5 |
| 2,989,726 | 6/61 | Crawford et al. | 340—15.5 |

BENJAMIN A. BORCHELT, *Primary Examiner.*

SAMUEL FEINBERG, *Examiner.*